United States Patent
Wang (10) Patent No.: US 8,623,538 B2
(45) Date of Patent: Jan. 7, 2014

(54) LIQUID COOLANT WITH MICROENCAPSULATED PHASE CHANGE MATERIALS FOR AUTOMOTIVE BATTERIES

(75) Inventor: Xiaohui Jasmine Wang, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 131 days.

(21) Appl. No.: 13/175,225

(22) Filed: Jul. 1, 2011

(65) Prior Publication Data

US 2013/0004806 A1    Jan. 3, 2013

(51) Int. Cl.
*H01M 10/50*    (2006.01)

(52) U.S. Cl.
USPC ............. 429/120; 429/62; 165/41; 165/164

(58) Field of Classification Search
CPC .................................................. H01M 10/5089
USPC ............. 429/120, 62; 180/65.1; 165/41, 164
See application file for complete search history.

(56) References Cited

U.S. PATENT DOCUMENTS

| 4,797,160 | A * | 1/1989 | Salyer ........................ 106/660 |
| 5,804,297 | A   | 9/1998 | Colvin et al. |
| 2002/0064692 | A1 * | 5/2002 | Johnson ...................... 429/11 |
| 2006/0063066 | A1 * | 3/2006 | Choi et al. .................. 429/120 |
| 2006/0231233 | A1 * | 10/2006 | Farid et al. .................... 165/10 |
| 2008/0078542 | A1 * | 4/2008 | Gering et al. ................ 165/202 |
| 2008/0090137 | A1 | 4/2008 | Buck et al. |
| 2011/0045333 | A1 | 2/2011 | Kim et al. |

OTHER PUBLICATIONS

Kenisarin, et al., Solar Energy Storage Using Phase Change Materials, Renewable & Sustainable Energy Reviews 11 (2007), pp. 1913-1965, Durham, UK.
U.S. Final Office Action dated Apr. 29, 2013 pertaining to U.S. Appl. No. 13/175,191, filed Jul. 1, 2011.
U.S. Non-Final Office Action dated Feb. 6, 2013 pertaining to U.S. Appl. No. 13/175,191, filed Jul. 1, 2011.
U.S. Final Office Action dated May 16, 2013 pertaining to U.S. Appl. No. 13/175,483, filed Jul. 1, 2011.
U.S. non-final Office Action dated Sep. 10, 2013 pertaining to U.S. Appl. No. 13/175,483, filed Jul. 1, 2011.
U.S. non-final Office Action dated Sep. 11, 2013 pertaining to U.S. Appl. No. 13/175,191, filed Jul. 1, 2011.

* cited by examiner

*Primary Examiner* — Nicholas P D'Aniello
(74) *Attorney, Agent, or Firm* — Dinsmore & Shohl LLP (57) ABSTRACT

A microencapsulated phase change material used in conjunction with a cooling fluid as part of a thermal management system for an automotive battery pack assembly. The microencapsulated phase change material is made to have enhanced latent heat transfer properties at lower (colder) temperatures and higher (elevated) temperatures such that a vehicle employing such an automotive battery pack assembly is more resistant to environments where freezing and overheating might otherwise be prevalent.

9 Claims, 6 Drawing Sheets

LIQUID COOLANT WITH MICROENCAPSULATED PHASE CHANGE MATERIALS FOR AUTOMOTIVE BATTERIES

BACKGROUND OF THE INVENTION

This invention relates generally to thermal management of battery packs, and more particularly to the use of microencapsulated phase change materials in conjunction with a liquid heat exchange medium to regulate the temperature of automotive battery packs.

Lithium-ion batteries are being used in automotive applications as a way to supplement, in the case of hybrid electric vehicles (HEVs), or supplant, in the case of plug-in electric vehicles (PEVs), conventional internal combustion engines (ICEs). In either variant, HEVs or PEVs belong to a larger class of vehicles known as electric vehicles (EVs). The high volumetric heat generation rate and generally passive construction of lithium-ion batteries provides both the durability and functionality needed to serve as a propulsion system for cars, trucks, buses, motorcycles and related automotive or vehicular platforms.

Temperature is one of the most significant factors impacting both the performance and life of a battery. Extremes (such as those encountered during protracted periods of inactivity in cold or hot environments, or due to extended periods of operation and concomitant heat generation on hot days) can negatively impact the ability of the battery to operate correctly, and in severe cases can destroy the battery entirely. In one particular scenario, starting operation of a vehicle parked on a hot day could expose the battery to a temperature rise in excess of its safe limits absent some device that is immediately available to remove the excess heat generated by such operation. Side effects of prolonged exposure to high temperatures such as this may include premature aging and accelerated capacity fade, both of which are undesirable. Conventional heat dissipation methods such as forced air and liquid cooling may prove to be effective at avoiding such side effects, but they add to overall vehicular system weight, complexity and parasitic power requirements.

SUMMARY OF THE INVENTION

A battery thermal management system based on a phase change material (PCM) has the potential to limit battery temperature extremes, thus acting to increase temperature uniformity, as well as to reduce heating and cooling requirements. This helps to prolong the life of heat-sensitive components, such as the charge-carrying battery cells that form the building blocks of battery modules and battery packs. PCMs can absorb and release a large amount of latent heat (in some instances up to fifty times higher than sensible heat) during isothermal (i.e., constant temperature) changes of phase, such as from solid-to-liquid or liquid-to-solid. As such, the use of PCMs can help to reduce or eliminate the need for active cooling components such as a fan, blower or pump in forced-air or forced-liquid cooling systems. This is beneficial in that the PCM can provide the ability to maintain the cell temperature in a desired temperature range without drawing power from the battery or another energy source. An example of a PCM-based approach to battery thermal management may be found in a co-pending U.S. patent application Ser. No. 13/175,483 entitled BATTERIES WITH PHASE CHANGE MATERIALS which was filed on the same day as the present application, owned by the Assignee of the present invention and hereby incorporated in its entirety by reference.

According to one aspect of the invention, a thermal management system for an automotive battery pack employs a microencapsulated version of a PCM-based thermal management system. This version, known as a microPCM, is made up of very small bi-component particles or capsules that include a core material tailored to latent heat changes within a temperature range typically countered in an automobile battery pack, along with an outer shell or capsule made from a polymer or related material such that together, the core and shell define a generally spherical foam-like material. MicroPCM capsules range from less than one micron to several hundred microns in diameter, where all three states of matter (solids, liquids and gases) may be used to form the core that can be microencapsulated. Advantages compared to non-microencapsulated PCM include increased protection of the core material, ease of incorporation into other materials, and decreased likelihood of leakage during melting. MicroPCMs may also be mixed in different mass percentages as a way to tailor their thermal response, for example, adjusting the phase change latent heat and phase change temperature. Additional advantages include low material costs, where microencapsulation can include between about 50 and 90 percent active material.

In a particular form, the thermal management system includes fluid conduit configured such that at least a portion thereof is placed in thermal communication with a heat-generating portion of the battery pack. Typically, the heat-generating portion is made up of the numerous battery cells. The fluid conduit (which may be part of a larger closed-circuit fluid medium flowpath) is configured to carry a fluid medium containing at least one microPCM as a suspension therein. By having the microPCM that is suspended or otherwise present in the fluid medium pass adjacent the heat-generating portion of the battery pack, the high latent heat inherent in the core material of the microPCM can be used to absorb (in the case of a battery cell experiencing relatively high-temperatures) or deliver (in the case of a battery cell experiencing freezing or other low temperatures) the latent heat as a way to balance or regulate the temperature of the battery cell.

In another optional form, the microPCM is made from an outer shell and an inner core of high latent heat material encased within the shell. In one form, the core can be made of eicosane, while the shell is made from a polymeric-based material. Eicosane is a paraffin-based mixture of alkanes that exhibit a high latent heat of fusion (for example, about 240 kJ/kg). Moreover, the melting point (37° C.) of eicosane makes it ideal for electric vehicle and related automotive applications, where a typical battery cell maximum excursion temperature of 40° C. may be expected to occur. Such paraffin-based PCMs are an excellent electrical insulator, with an electrical resistivity of between $10^{13}$ and $10^{17}$ ohm meter. Such high resistivity promotes safe, reliable electrical operation. Furthermore, such a microPCM has been shown to be durable under various battery charge and discharge cycles, with particular emphasis on avoidance of microcapsule damage due to compression force deflection under different battery operating temperatures. While other materials may be used, such as non-paraffin organic PCM fatty acids, care must be exercised to ensure that melting or related phase change occur in temperature ranges commensurate with HEV or PEV battery pack operating temperatures.

In a more particular embodiment of the microPCM, each particle may be between about 1 micron in diameter and about 100 microns in diameter. In another particular form, more than one microPCM may be present. For example, a first microPCM may be included that is configured to exhibit phase change at a first (for example, lower) temperature, while a second microPCM may be included that is configured to exhibit phase change at a second (for example, higher) temperature. In one form, the first temperature coincides with the freezing temperature of water (i.e., about 0° C.) or colder, while the second temperature is at an upper limit of the battery cell or other temperature-sensitive component. In the case of a lithium-ion battery cell, such an upper temperature may be about 40° C. or higher. The thermal management system may be configured such that the conduit carrying the fluid used for heat exchange is configured as a substantially closed-loop passive device. In another option, a cooling plate that includes microPCM may be placed in thermal communication with the heat-generating portion of the battery pack. In this way, the plate acts as a supplemental heat exchange medium. In a more particular form, the cooling plate has one or more channels formed in its surface; these channels may be loaded with the microPCM. Such a cooling plate may (in an alternate configuration) act as a stand-along heat-exchange device such that in the event of inoperability of the liquid-based cooling (or its absence altogether), at least a portion of the thermal management of the battery cells within the battery pack may be addressed.

According to another aspect of the invention, an automotive battery pack assembly is disclosed. The assembly includes a battery pack configured to provide motive power to a vehicular platform, as well as a thermal management system to provide at least one of heating and cooling to the battery pack. More particularly, the thermal management system is in thermal communication with the battery pack, where one particular thermal interaction involves the thermal management system removing heat from a heat-generating source (for example, one or more battery cells) within the battery pack. In such a configuration, the thermal management system includes fluid conduit placed in thermal communication with a heat-generating portion of the battery pack, as well as a fluid medium containing at least one microPCM.

Optionally, an outer shell of the material is made from a polymeric material. As discussed above, a high latent heat material that forms an inner core may be encased within the outer shell; preferably, this material has a latent heat of fusion that operates at less than about 0° C. and a latent heat of vaporization of about 40° C. Achieving absorption or release of latent heat can also be achieved by combining two or more PCMs, whether in a common outer shell, or each as part of its own unique microPCM structure; in either event, the aggregate material is considered to exhibit thermal composite-like properties. Such composite materials may have their properties tailored to have one of them to go through phase changes at a temperature different than that of the other materials making up the composite.

According to another aspect of the invention, a method of controlling temperature in a battery pack includes providing a fluid medium with at least one microPCM and placing the fluid medium in heat exchange communication with a heat-sensitive component within the battery pack. In this way, at least a portion of heat contained within one of the heat-sensitive component and the microPCM is transferred between them.

Optionally, the heat-sensitive component is a battery cell. In another option, a cooling plate may be included to provide additional heat exchange capability. As with the fluid discussed above, the cooling plate may be coupled to one or more microPCMs such that at least a portion of heat contained within one of the cooling plate and the heat-sensitive component is transferred to the other. In a particular form, the one or more microPCMs may be circulated through a substantially closed-loop thermal management system. In a more particular form, the system may be passive in that pumps and related means for circulating the microPCM-bearing liquid are not needed. As with the previous embodiments, the microPCM may be made up of numerous different microPCMs, such as the aforementioned composite form. For example, such multiple materials may be used to tailor the heat exchange between them and the heat-sensitive component to one or more particular temperature regimes. As stated above, microPCMs in close contact with battery cells can act as a thermal buffer that in turn may result in reduced power fade, reduced capacity fade, improved battery life and durability, reduced warranty costs, improved vehicle range and prevention of thermal runaway.

DETAILED DESCRIPTION

Figure 1:
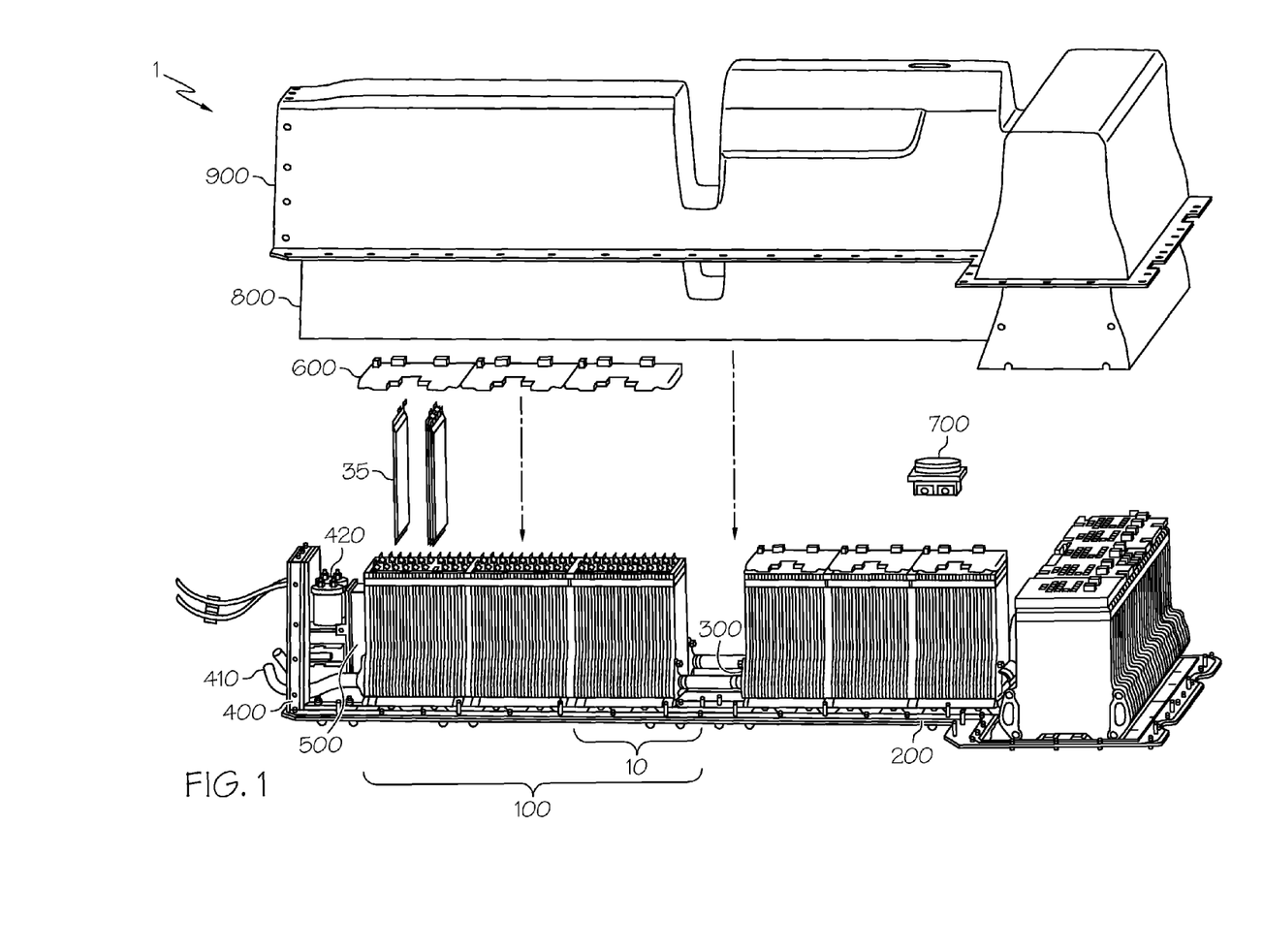
FIG. 1 shows a vehicular propulsion system in the form of a battery pack.

Referring first to FIG. 1, a vehicular propulsion system 1 employing numerous battery packs 10 (also known as battery modules) is shown in a partially-exploded view. Depending on the power output desired, numerous battery packs 10 may be combined to define a battery section 100; such may be aligned to be supported by a common tray 200 that can also act as support for coolant hoses 300 that can be used in configurations where supplemental cooling may be desired. A bulkhead 400 may define a primary support structure that can function as an interface for the coolant hoses 300, as well as house a battery disconnect unit in the event battery service is required. In addition to providing support for the battery section 100, tray 200 and bulkhead 400 may support other modules, such as a voltage, current and temperature measuring module 500. Placement of individual battery cells 35 (to be discussed in more detail below) relative to battery packs 10 is shown, as is the covering thereof by a voltage and temperature sub-module 600. In one typical example, battery pack 10 may include up to about two hundred individual battery cells 35. Other features, such as manual service disconnect 700, insulation 800 and a cover 900 complete the vehicular propulsion system 1.

Figure 2:
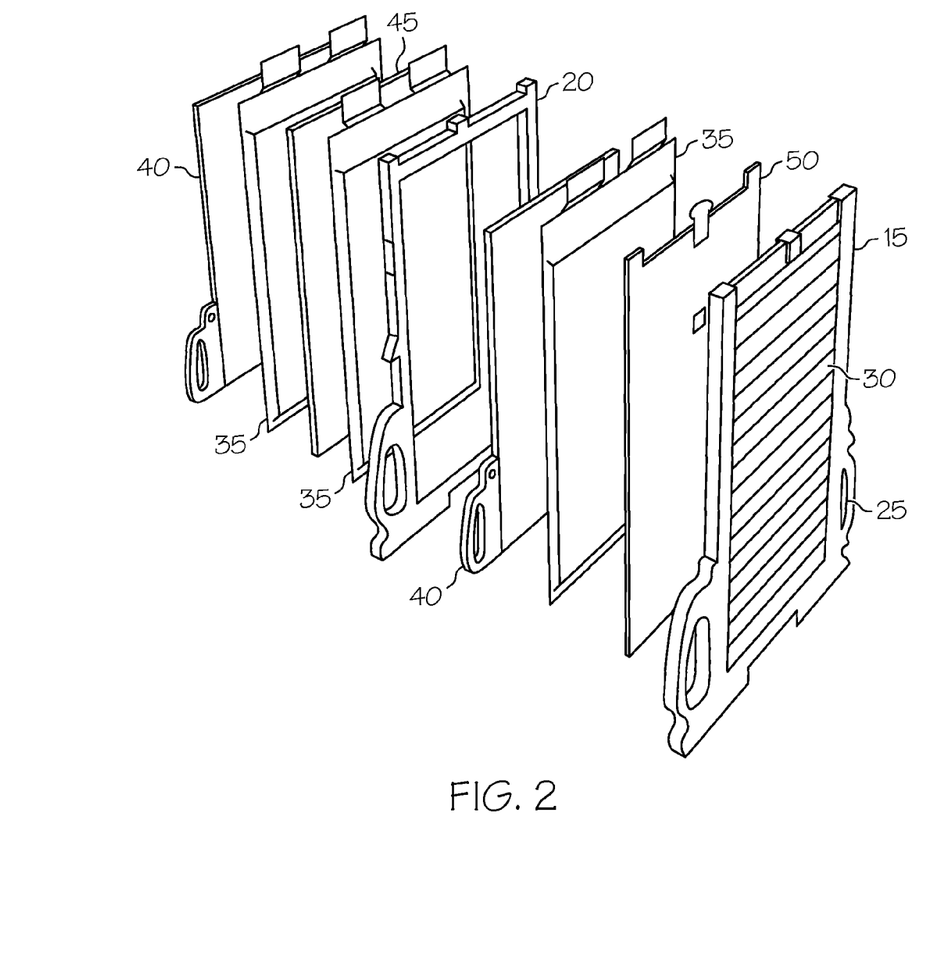
FIG. 2 is an exploded view of one embodiment of a portion of a battery module that makes up the battery pack of FIG. 1, where the module includes components for liquid medium heat exchange with battery cells within the module.

In addition to the aforementioned battery disconnect unit, other power electronic components may be used for the battery section 100, including, a battery management system or related controllers. In liquid-cooled battery packs (such as that disclosed herein), such components are not cooled, despite being located very close to the numerous battery packs 10. As a result, such heat-generating components may heat up nearby packs 10, thereby creating non-uniform degradation of the cells 35 and a concomitant imbalance between them. Since most of these power electronic components are located on the top and end of the battery pack 10, microPCM of the present invention placed on cooling plates 30 (discussed in more detail below) between such components and the cells 35 of the battery packs 10 can act as heat sinks to absorb and subsequently dissipate the heat generated convectively through air-based or liquid-based means.

Referring next to FIG. 2, one embodiment of a portion of a battery pack 10 is shown in an exploded view. End frame 15 and repeating frame 20 form the basis for the structure of the battery pack 10. The end frame 15 can have an edge portion 25 surrounding cooling plate 30 that may include ribs for added stability. There are battery cells 35, cooling fins 40, and foam isolator sheets 45, these last two features respectively discussed in more detail in co-pending U.S. patent application Ser. No. 13/175,191 entitled BATTERY THERMAL INTERFACES WITH MICROENCAPSULATED PHASE CHANGE MATERIALS FOR ENHANCED HEAT EXCHANGE PROPERTIES that was filed on the same day as the present application, owned by the Assignee of the present invention and hereby incorporated in its entirety by reference, and the aforementioned application entitled BATTERIES WITH PHASE CHANGE MATERIALS. The end frames 15 and repeating frames 20 are typically made of a light-weight, non-conductive material, such as plastics (for example, polypropylene, nylon 6-6) and other low-cost materials. The frames 15, 20 can be fiber-reinforced for structural strength, if desired. An insulative sheet 50 is placed between the battery cell 35 and the cooling plate 30 to protect the battery cell 35. In a preferred form, insulative sheet 50 is made of a plastic or related material, and is affixed to cooling plate 30. One or more thermistors (not shown) are situated between the insulative sheet 50 and the cooling plate 30 to monitor battery cell 35 temperature. In a battery module 10, there may be numerous thermistors, for example, one for each insulative sheet 50/cooling plate 30/battery cell 35 interface. Additional components, such as pack plates, voltage inner connect boards or the like (none of which are shown) are used to help form the assembled battery pack 10.

Figure 6:
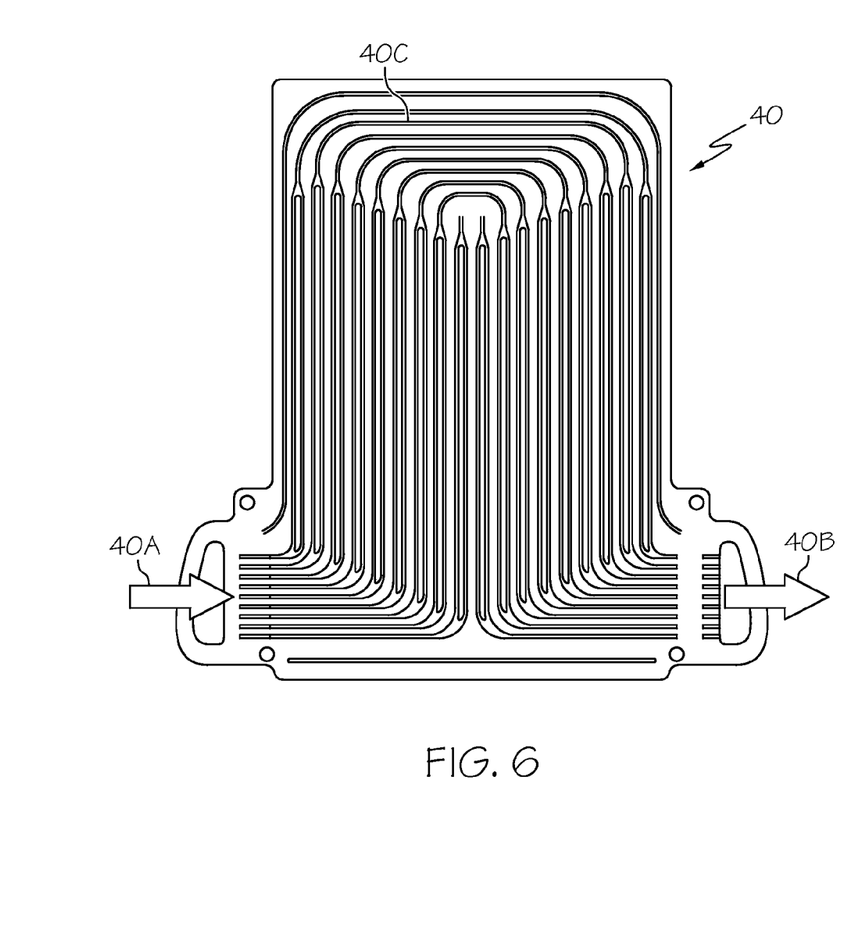
FIG. 6 shows how a microPCMs suspended in a fluid medium can be made to pass through the channels of a coolant plate.
Figure 7:
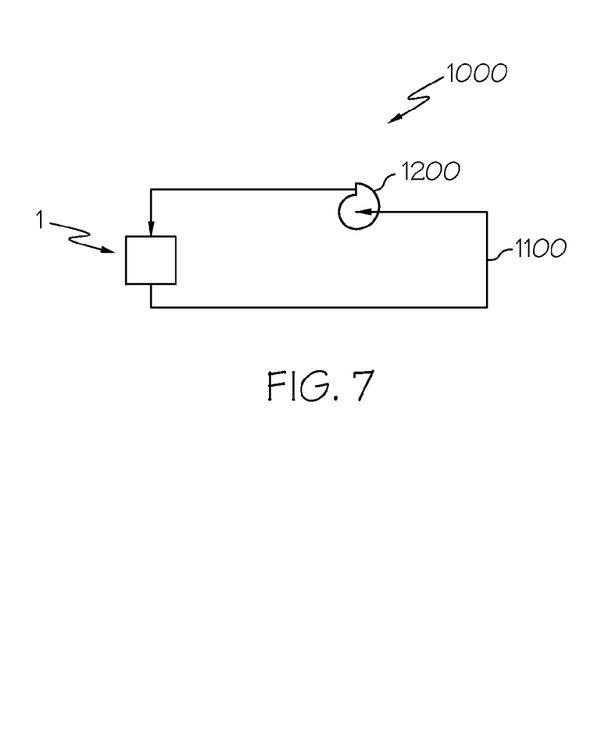
FIG. 7 shows a schematic closed-circuit fluid medium flowpath and its interaction with a battery pack.

Referring next to FIGS. 6 and 7, in one preferred form, the microPCM may be suspended in a liquid coolant that may be circulated generally through a closed-circuit fluid medium flowpath 1000 and more particularly through one or more cooling fins 40 that make up a portion of battery pack 10. In this configuration, the suspension (which may include a glycol/water mixture, for example, at a 50-50 ratio) may be made to pass through cooling flowpath 40C from an inlet 40A and toward an outlet 40B, where the flowpath 40C may take the form of numerous substantially parallel individual paths or channels, as shown with particularity in FIG. 6. In one form, numerous cooling fins 40 may be arranged within the stack-like configuration of battery pack 10. As mentioned above, the placement of cooling plates 30 about the periphery of the battery pack 10 (such as at one or more of the opposing ends thereof, such as depicted in FIG. 2) can be an especially useful way to provide supplemental heat transfer as a way to avoid non-uniform thermal conditions. Referring with particularity to FIG. 7, closed-circuit fluid medium flowpath 1000 is shown thermally interacting with the vehicular propulsion system 1 that is in turn made up of numerous battery packs 10. In one form, the flowpath 1000 functions as a cooling circuit (for example, in situations where supplemental cooling of battery cells 35 or related equipment in the battery packs 10 is required), while in another form, the flowpath 1000 may function as a heating circuit (for example, in situations where the battery cells 35 or related equipment in the battery packs or modules 10 have been exposed to freezing temperatures for a protracted length of time). Flowpath 1000 may include conduit or elated piping 1100 to convey the fluid medium, and use an optional pump 1200 and valves (not shown). It will be appreciated by those skilled in the art that in a purely passive design of flowpath 1000, the pump 1200 would not be present; both the passive and active versions are considered to be within the scope of the present invention. Additional componentry, such as radiators, condensers and related heat-exchange equipment (none of which are shown) may also be used as part of flowpath 1000.

Figure 5:
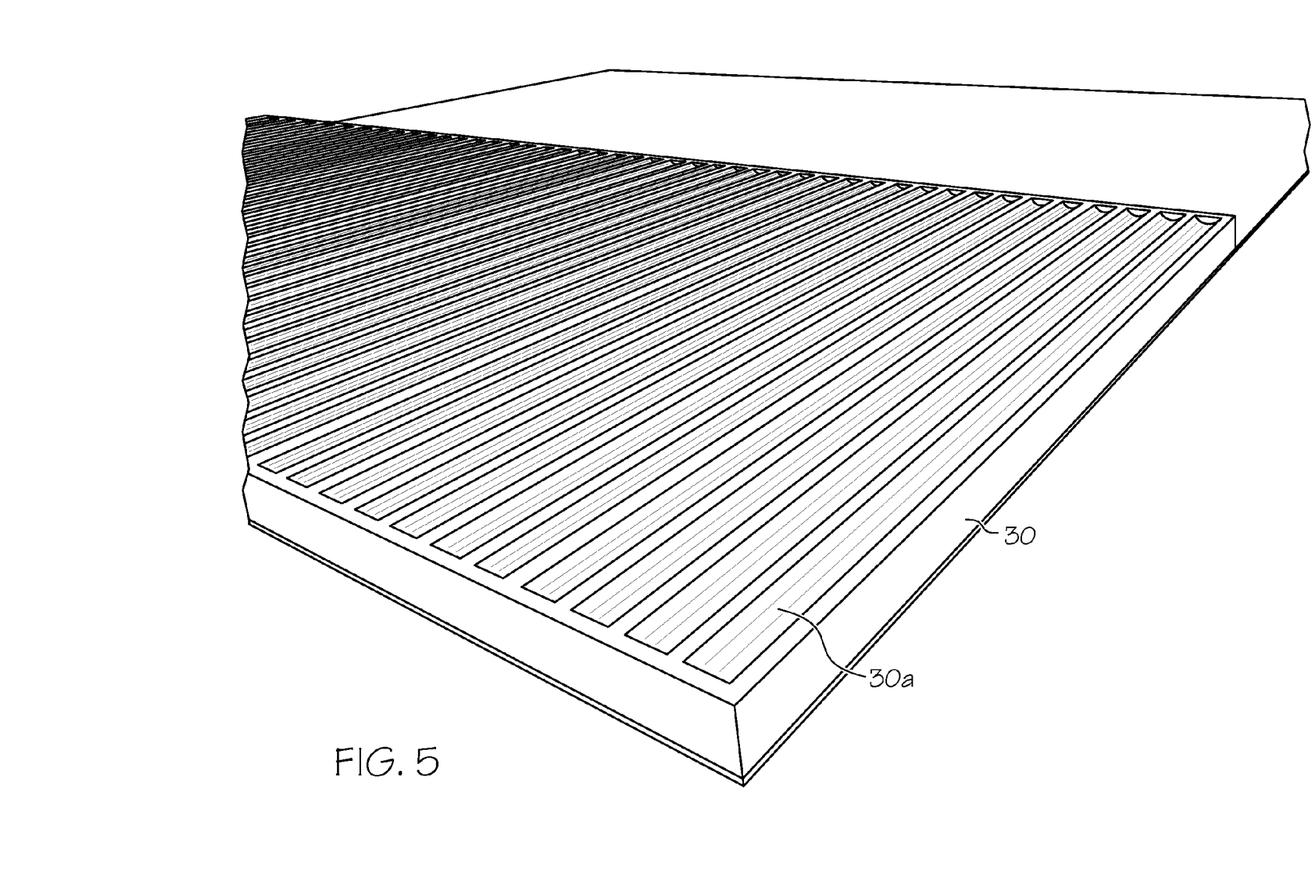
FIG. 5 shows an optional cooling plate with recesses formed therein that may accept a wet-cake form of microPCM.

Referring next to FIG. 5, a portion of a representative cooling plate 30 is shown. As indicated above, devices such as cooling plate 30 (as well as foam isolator sheet 45) may be used to provide supplemental heat transfer to the microPCM-infused liquid circulating through cooling fins 40 and flowpath 1000. Such supplemental heat transfer may be particularly valuable in situations where a region within the battery pack 10 may require differing degrees of heat transfer. As such, the cooling plate 30 may be considered to be a more solid version of the foam isolator sheet 45. In a manner generally similar to that of the foam isolator sheet 45, one advantage of coupling the microPCM to the cooling plate 30 stems from its proximity to the heat-generating cells 35.

The construction of the cooling plate 30 is such that individual channels 30A formed therein may be used to allow the plate 30 to act as a thermal composite, where (if need be) different channels 30A may have differently-tailored microPCMs placed therein. In one form, the phase-changing thermal properties (whether from solid to liquid or liquid to solid, for example) can be made to occur at two different temperatures. In this way, regions expected to be exposed to different thermal environments than its neighbors may include microPCMs with latent heat properties tailored to particular temperature regimes. In one form, one microPCM (which may, for example, be disposed in one or more of the channels 30A) may be made to have its phase change at a low temperature limit (e.g., about −10° C.), and another microPCM to have a phase change at a high temperature limit (e.g., about 45° C.). These values are listed as exemplary only; it will be appreciated by those skilled in the art that the temperatures at which the latent heat materials of the microPCMs can be tailored to the specific need of the battery pack 10 and that all such temperature ranges are within the scope of the present invention. Such dual-temperature activation helps to maintain battery cell 35 temperature for longer periods of time and over widely-varying temperature conditions. In situations where greater thermal excursions (for example, higher temperatures) may be experienced, the augmented performance made possible by the cooling plate 30, as well as a supplemental cooling circuit embodied by flowpath 1000, may provide an additional measure of protection of the battery cells 35 or other temperature-sensitive components within battery pack 10.

Figure 3:
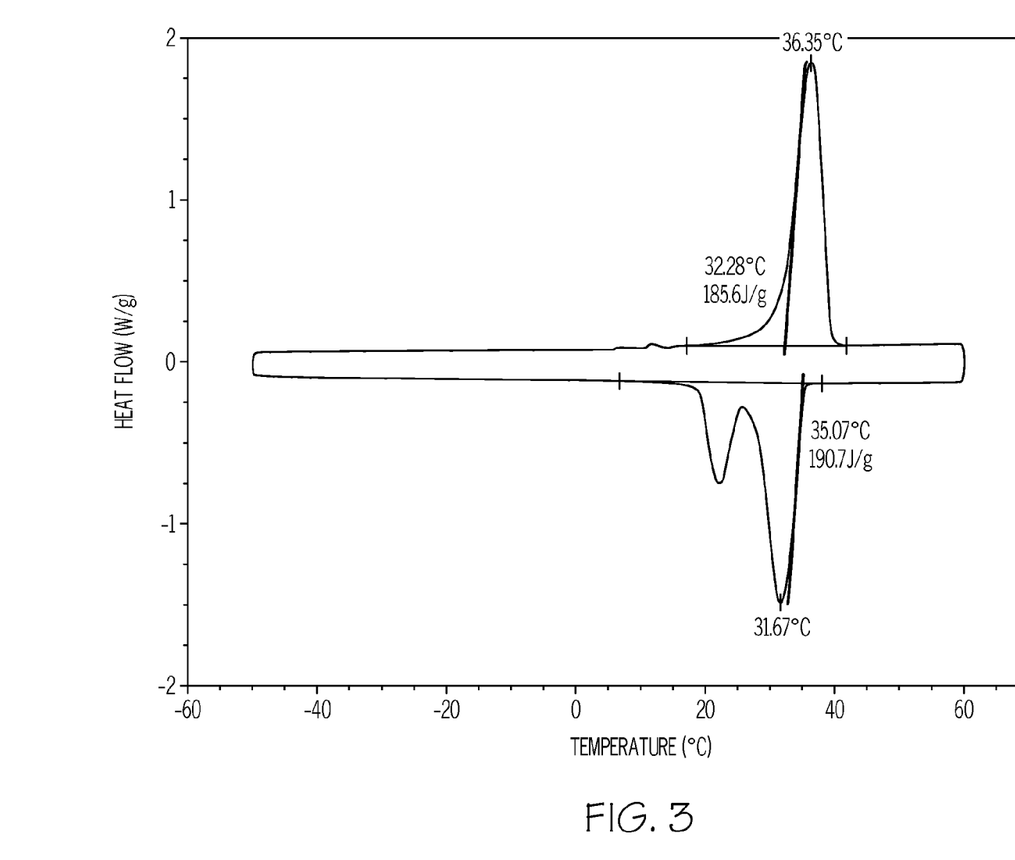
FIG. 3 is a Differential Scanning calorimetry (DSC) chart showing the phase change properties of a bulk laboratory grade microPCM that uses eicosane as the high latent heat material.

Referring next to FIG. 3, results from DSC testing are used to determine the phase change properties of bulk laboratory-grade microPCM eicosane. The scan rate used in this test was 5° C. per minute, and the temperature range was controlled from −50° C. to 80° C. The peaks indicate phase change upon heating (top) and cooling (bottom). The peak on the top curve shows the behavior of the solid-to-liquid phase change transition, while the area under the peak is the latent heat for the solid-to-liquid transition (i.e., the latent heat of fusion); in the present example, the latent heat was found to be 185.6 J/kg.

This curve also indicates that liquid starts to appear at 32.28° C. and that eicosane is completely liquid at 36.35° C. Likewise, the peaks on the bottom together show the behavior of the liquid-to-solid phase change transition, where the left peak shows the liquid-to-liquid phase change transition associated with eicosane, while the right peak shows the liquid-to-solid phase change transition. The area under these peaks is the latent heat for the solid-to-liquid transition; in the present example, the latent heat was found to be 190.7 J/kg. This curve also indicates that solid eicosane starts to appear at 35.07° C. and that it is completely solid at 31.67° C.

Figure 4:
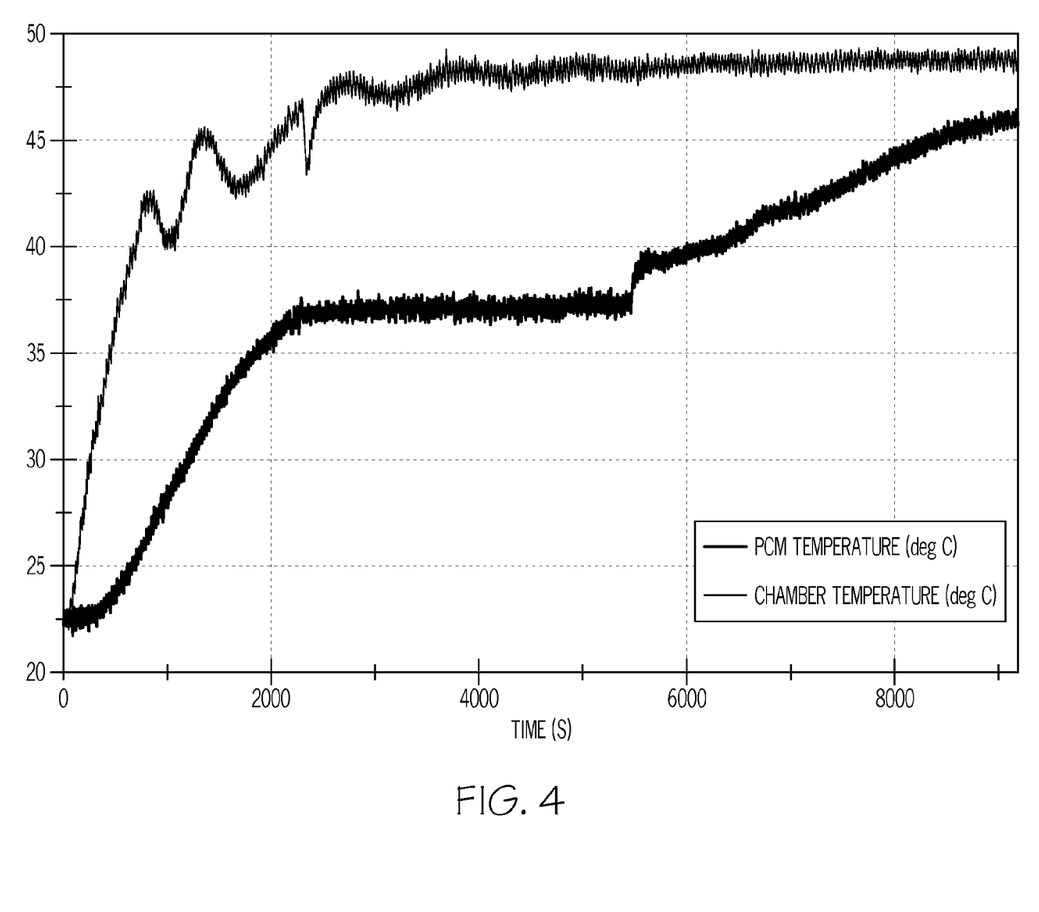
FIG. 4 is a chart showing thermal testing in an environmental chamber of a microPCM that uses eicosane as the high latent heat material.

Referring next to FIG. 4, the results of microPCM eicosane thermal testing conducted by the present inventor is shown. In particular, the test was conducted in an environmental chamber test setup with the temperature running from 23° C. to 48° C. The lower curve (which corresponds to the microPCM temperature) shows that a 12.1 gram sample of eicosane managed to stay at approximately 37° C. for about 1 hour while being heated.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, terms such as "substantially" are utilized to represent the inherent degree of uncertainty that may be attributed to any quantitative comparison, value, measurement, or other representation. It is also utilized to represent the degree by which a quantitative representation may vary from a stated reference without resulting in a change in the basic function of the subject matter at issue.

For the purposes of describing and defining the present invention it is noted that the term "device" is utilized herein to represent a combination of components and individual components, regardless of whether the components are combined with other components. For example, a device according to the present invention may comprise an electrochemical conversion assembly or fuel cell, a vehicle incorporating an electrochemical conversion assembly according to the present invention. Furthermore, variations on the terms "automobile", "automotive", "vehicular" or the like are meant to be construed generically unless the context dictates otherwise. As such, reference to an automobile will be understood to cover cars, trucks, buses, motorcycles and other similar modes of transportation unless more particularly recited in context.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An automotive battery pack assembly comprising:
 a battery pack comprising a heat generating source with two or more individual regions, each individual region of said two or more individual regions has a particular temperature regime, said battery pack configured to provide motive power to a vehicular platform; and
 a thermal management system in thermal communication with said heat-generating source within said battery pack, said thermal management system comprising:
  a cooling plate placed in thermal communication with said heat-generating source of said battery pack and comprising a plurality of individual channels, wherein each individual channel of said plurality of individual channel has two or more tailored microencapsulated phase change materials placed therein, each tailored microencapsulated phase change material corresponds with said particular temperature regime of each individual region;
  a fluid conduit configured such that at least a portion thereof is placed in thermal communication with a heat-generating portion of said battery pack; and
  a fluid medium containing at least one microencapsulated phase change material therein, said fluid medium disposable within said fluid conduit such that an exchange of heat between said heat-generating portion of said battery pack and said at least one microencapsulated phase change material takes place during said thermal communication;
 wherein said two or more tailored microencapsulated phase change material comprises a plurality of tailored microencapsulated phase change materials one of which is configured to exhibit phase change at a first temperature corresponding to a first temperature regime of a first region of the battery pack and another of which is configured to exhibit phase change at a second temperature that is higher than said first temperature, the second temperature corresponding to a second temperature regime of a second region of the battery pack.

2. The automotive battery pack assembly of claim 1, wherein an outer shell of said at least one microencapsulated phase change material comprises a polymeric material and a high latent heat material that forms an inner core that is encased within said outer shell comprises a material with a latent heat of fusion that operates at less than about 0° C. and a latent heat of vaporization of about 40° C.

3. The automotive battery pack assembly of claim 2, wherein said high latent heat material comprises a plurality of high latent heat materials.

4. The automotive battery pack assembly of claim 1, wherein said at least one microencapsulated phase change material comprises a plurality of microencapsulated phase change materials, each made up of a high latent heat material that forms an inner core that is encased within a respective outer shell, further wherein said high latent heat material within each of said plurality of microencapsulated phase change materials is configured to go through phase changes at a temperature different than that of the other of said plurality of microencapsulated phase change materials.

5. The automotive battery pack of claim 2 wherein said core comprises eicosane.

6. The automotive battery pack of claim 1, wherein a size of said at least one microencapsulated phase change material is from between about 1 micron in diameter to about 100 microns in diameter.

7. The automotive battery pack stem of claim 1, wherein said at least one microencapsulated phase change material is formed as a suspension in said fluid medium.

8. The automotive battery pack of claim 1, wherein said fluid conduit is configured as a substantially closed-loop passive device.

9. The automotive battery pack of claim 1, wherein said at least one microencapsulated phase change material comprises a plurality of microencapsulated phase change materials one of which is configured to exhibit phase change at a first temperature and another of which is configured to exhibit phase change at a second temperature that is higher than said first temperature.

* * * * *